United States Patent
Verghese et al.

(10) Patent No.: US 9,131,462 B1
(45) Date of Patent: Sep. 8, 2015

(54) DETERMINING A GEOGRAPHIC LOCATION OF A MOBILE DEVICE

(71) Applicant: Google Inc., Mountain View, CA (US)

(72) Inventors: Philip Cheeran Verghese, Santa Clara, CA (US); Kenneth Joseph Leftin, San Francisco, CA (US); Andrew Oplinger, San Francisco, CA (US); Joseph Lapenna, San Francisco, CA (US); Kenneth S. Norton, San Carlos, CA (US)

(73) Assignee: Google Inc., Mountain View, CA (US)

( * ) Notice: Subject to any disclaimer, the term of this patent is extended or adjusted under 35 U.S.C. 154(b) by 28 days.

(21) Appl. No.: 13/767,816

(22) Filed: Feb. 14, 2013

Related U.S. Application Data

(60) Provisional application No. 61/598,862, filed on Feb. 14, 2012.

(51) Int. Cl.
*H04W 4/02* (2009.01)
*H04W 64/00* (2009.01)

(52) U.S. Cl.
CPC ..................................... *H04W 64/00* (2013.01)

(58) Field of Classification Search
CPC ......... H04W 64/00; H04W 4/02; H04W 4/22; H04W 24/00; G08B 25/016; G06Q 10/08
USPC .......... 455/456.1–456.3, 456.6, 404.1–404.2, 455/67.11, 115.1, 115.3; 340/539.11, 340/539.13
See application file for complete search history.

(56) References Cited

U.S. PATENT DOCUMENTS

| | | | |
|---|---|---|---|
| 7,587,274 B2 * | 9/2009 | Kaldewey et al. | 701/434 |
| 8,489,127 B2 * | 7/2013 | Huang et al. | 455/457 |
| 2007/0254626 A1 | 11/2007 | Ahlgren | |
| 2009/0186629 A1 | 7/2009 | Soelberg et al. | |
| 2013/0122935 A1 * | 5/2013 | Das et al. | 455/456.3 |

OTHER PUBLICATIONS

"GPS Logger for Android", retrieved on Feb. 14, 2012 from <https://market.android.com/details?id=com.mendhak.gpslogger&hl=en>.

* cited by examiner

*Primary Examiner* — Cong Tran
(74) *Attorney, Agent, or Firm* — Dority & Manning, P.A.

(57) ABSTRACT

Systems and methods for providing a geographic location of a mobile device are provided. In one aspect, a method includes determining a geographic location of the mobile device. The method also includes storing the determined geographic location in a geographic location history in a local memory of the mobile device. The geographic location of the mobile device is determined and stored in the geographic location history at a first time interval. The method also includes providing the geographic location history to a server at a second time interval. The second time interval is longer than the first time interval.

22 Claims, 10 Drawing Sheets

DETERMINING A GEOGRAPHIC LOCATION OF A MOBILE DEVICE

CROSS REFERENCE TO RELATED APPLICATION

This application claims priority under 35 U.S.C. §119(e) and the benefit of U.S. Provisional Application No. 61/598,862, filed Feb. 14, 2012, and entitled, "DETERMINING A GEOGRAPHIC LOCATION OF A USER," the entire disclosure of which is incorporated herein by reference.

BACKGROUND

The subject technology generally relates to mobile data communication and, in particular, relates to determining and storing a geographic location of a mobile device.

Geographic locating services may provide a current geographic location of a mobile device (and an associated likely geographic location of a user). In order to store an accurate geographic location of the mobile device, the geographic locating service may continuously receive location information from a mobile device (e.g., a mobile phone). However, continuously transmitting data to the geographic locating service may drain the battery of the mobile device, reducing the battery life, reducing power available for other activities on the mobile device, and wasting energy. As the foregoing illustrates, a new approach for recording and reporting a geographic location of a mobile device may be desirable.

SUMMARY

The disclosed subject matter relates to a computer-implemented method for providing a geographic location of a mobile device. The method includes determining a geographic location of the mobile device. The method also includes storing the determined geographic location in a geographic location history in a local memory of the mobile device. The geographic location of the mobile device is determined and stored in the geographic location history at a first time interval. The method also includes determining whether the mobile device is moving or stationary. The method also includes providing the geographic location history to a server at a second time interval if the mobile device is moving and at a third time interval if the mobile device is stationary. The second time interval is longer than the first time interval. The third time interval is longer than the second time interval.

The disclosed subject matter further relates to a computer-readable medium. The computer-readable medium includes instructions that, when executed by a computer, cause the computer to implement a method for providing a geographic location of the computer. The instructions include code for storing a determined geographic location in a geographic location history in a local memory of the computer. The geographic location of the computer is determined and stored in the geographic location history at a first time interval. The instructions also include code for determining whether the computer is moving or stationary. The instructions also include code for providing the geographic location history to a server at a second time interval if the computer is moving and at a third time interval if the computer is stationary. The second time interval is longer than the first time interval. The third time interval is longer than the second time interval.

The disclosed subject matter further relates to a mobile device. The mobile device includes one or more processors. The mobile device also includes a memory. The memory includes instructions which, when executed by the one or more processors, cause the one or more processors to implement a method for providing a geographic location of the mobile device. The instructions include code for storing a determined geographic location and a timestamp in a geographic location history in a local memory unit of the mobile device. The timestamp indicates a time of determination of the determined geographic location. The geographic location of the mobile device is determined and stored in the geographic location history at a first time interval. The instructions also include code for determining whether the mobile device is moving or stationary. The instructions also include code for providing the geographic location history to a server at a second time interval if the mobile device is moving and at a third time interval if the mobile device is stationary. The second time interval is longer than the first time interval. The third time interval is longer than the second time interval.

The disclosed subject matter further relates to a method, implemented on a server, for providing a geographic location of a mobile device via a geographic locating service. The method includes facilitating receiving, from a computer associated with a first user of the geographic locating service, a request for a current geographic location of a second user of the geographic locating service. The method also includes facilitating transmitting, to a mobile device associated with the second user, a request for a current geographic location of the mobile device. The method also includes facilitating receiving, in response to the request for the current geographic location of the mobile device, a geographic location history of the mobile device. The geographic location history includes the current geographic location of the mobile device and a set of past geographic locations of the mobile device. The method also includes storing, within a data memory associated with the server, the geographic location history of the mobile device associated with the second user. The method also includes providing, to the computer associated with the first user, the current geographic location of the mobile device associated with the second user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

Figure 1:
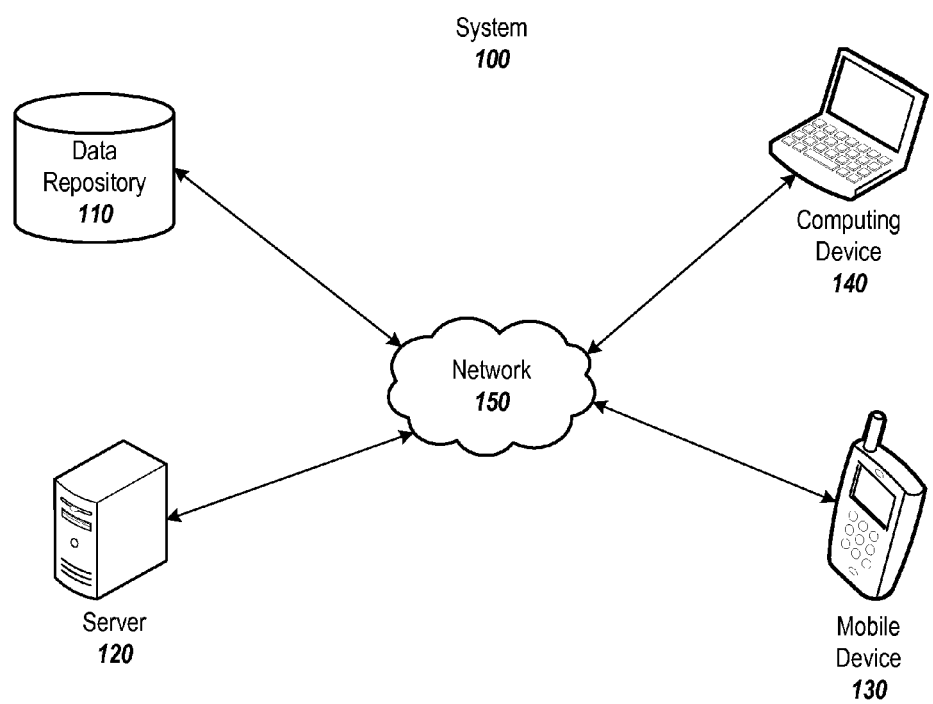
FIG. 1 illustrates an example of a system configured to determine a geographic location of a mobile device.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

As noted above, continuously transmitting location data from a mobile device to a geographic locating service may drain the battery of the mobile device. However, geographic locating services that provide current geographic location and geographic location history data are interesting and useful for some users. While continuously transmitting a small amount of data (e.g., one geographic location every minute) may be expensive in terms of battery life and power usage, transmitting a large amount of data less frequently (e.g., 120 geographic locations every two hours) may be less expensive in terms of battery life and power usage. Thus, an approach to continuously determining and storing the geographic location of a mobile device that reduces the frequency of data transmissions by the mobile device may be desirable.

The subject technology is related to a mobile device providing its geographic location to a server. In some implementations, a mobile device stores a geographic location history within a local memory of the mobile device. The geographic location history may include several past geographic locations of the mobile device. The geographic locations within the geographic location history are determined by the mobile device, for example, based on a cellular signal, a WiFi signal, and/or a global positioning system (GPS) signal. The mobile device determines that a triggering event has occurred. The triggering event may correspond to, for example, receiving a request from a server (e.g., a geographic locating server) for the current geographic location of the mobile device or determining that a threshold time period (e.g., ten minutes) has passed since the geographic location history of the mobile device was last provided to a server. The mobile device provides, in response to the triggering event, the geographic location history to the server. The geographic location history may also include the current geographic location of the mobile device.

Advantageously, in some implementations of the subject technology, a mobile device may be able to provide, to a server (e.g., a geographic locating server) a geographic location history that includes geographic locations of the mobile device determined quasi-continuously (e.g., once every ten seconds, ten minutes, or hour) while conserving the battery life of the mobile device by transmitting fewer messages to the server, resulting in conserving the battery life and power usage of the mobile device. As a result, a user may be able to take advantage of the geographic locating service without excessively consuming the battery of his/her mobile device. In some mobile devices, transmitting a message is a costly operation in terms of battery power, while determining a geographic location is less costly in terms of battery power.

FIG. 1 illustrates an example of a system 100 configured to determine a geographic location of a mobile device. As used herein, the phrase "geographic location" encompasses its plain and ordinary meaning including, but not limited to, a location within a physical space. A geographic location may be represented, for example, as a latitude and longitude or as a street address. In some examples, a geographic location may be coupled with a radius of certainty (e.g., within two kilometers of a point or within 100 meters of a point). As shown, the system 100 includes a data repository 110, a server 120, a mobile device 130 and a computing device 140. The data repository 110, the server 120, the mobile device 130, and the computing device 140 may be configured to communicate with one another via a network 150. The network 150 may include the Internet, an intranet, a local area network, a wide area network, a wired network, a wireless network, a cellular network, a WiFi network, or a virtual private network (VPN).

The data repository 110 stores data (e.g., text, images, videos, audio files, user data, location data, etc.) related to a geographic locating service. The data repository 110 may include a single machine, multiple machines, a single processor system, or a multi-processor system. One example of the data repository 110 is described in more detail in conjunction with FIG. 2 below.

The server 120 includes a module for managing geographic location information or user information stored within the data repository 110. The server 120 may be implemented as a single machine with a single processor, a multi-processor machine, or a server farm including multiple machines with multiple processors. One example of the server 120 is described in more detail in conjunction with FIG. 3 below.

The mobile device 130 may be a mobile phone, a personal digital assistant (PDA), a tablet computer, a netbook, or a laptop computer. The mobile device 130 may be portable and may oftentimes be carried by a user, for example, in a pocket, a purse, a backpack, or a briefcase. The mobile device 130 is configured to determine its geographic location, store a geographic location history, and transmit the geographic location to the server 120. While only one mobile device 130 is illustrated in FIG. 1, the subject technology may be implemented in conjunction with one or more mobile devices 130. One example of the mobile device 130 is described in more detail in conjunction with FIG. 4 below.

The computing device 140 may be a laptop computer, a desktop computer, a mobile phone, a personal digital assistant (PDA), a tablet computer, a netbook, a television with one or more processors embedded therein or coupled thereto, a physical machine, or a virtual machine. The computing device 140 may include one or more of a keyboard, a mouse, a display, or a touch screen. The computing device 140 may also include a web browser or an application configured to access a geographic locating service.

In one example, a user of the computing device 140 accesses the web browser or the application on the computing device 140 to determine the current geographic location of a mobile device 130. In order for the user of the computing device 140 to be able to determine the current geographic location of the mobile device 130, the user of the mobile device 130 must provide permission for the user of the computing device 140 to access his/her location. The user of the mobile device 130 may withdraw such permission at any time. As used herein, the phrase "current geographic location" includes, for example, a geographic location (e.g., as defined above) that was determined within a predefined amount of time before the current time. The current time may correspond to a time when a request (e.g., a request coming from a server) for the geographic location was received. The predefined amount of time may be, for example, 10 seconds, 30 seconds, one minute, two minutes, etc. In some aspects, the predefined amount of time may be based on a processing speed or a network connection speed.

The user of the mobile device 130 needs to affirmatively indicate that the user of the computing device 140 has permission to access the geographic location information of the user of the mobile device 140. The user of the computing device 140 may be different from the user of the mobile device 130. While only one computing device 140 is illustrated in FIG. 1, the subject technology may be implemented in conjunction with one or more computing devices 140.

While each of the data repository 110, the server 120, the mobile device 130, and the computing device 140 are illustrated in FIG. 1 as separate machines, in example aspects, one or more of the data repository 110, the server 120, the mobile device 130, and the computing device 140 may be implemented as a single machine. For example, the functions of the data repository 110 and the server 120 may be implemented within a single machine. The functions of the mobile device 130 and the computing device 140 may be implemented within a single machine.

Figure 2:
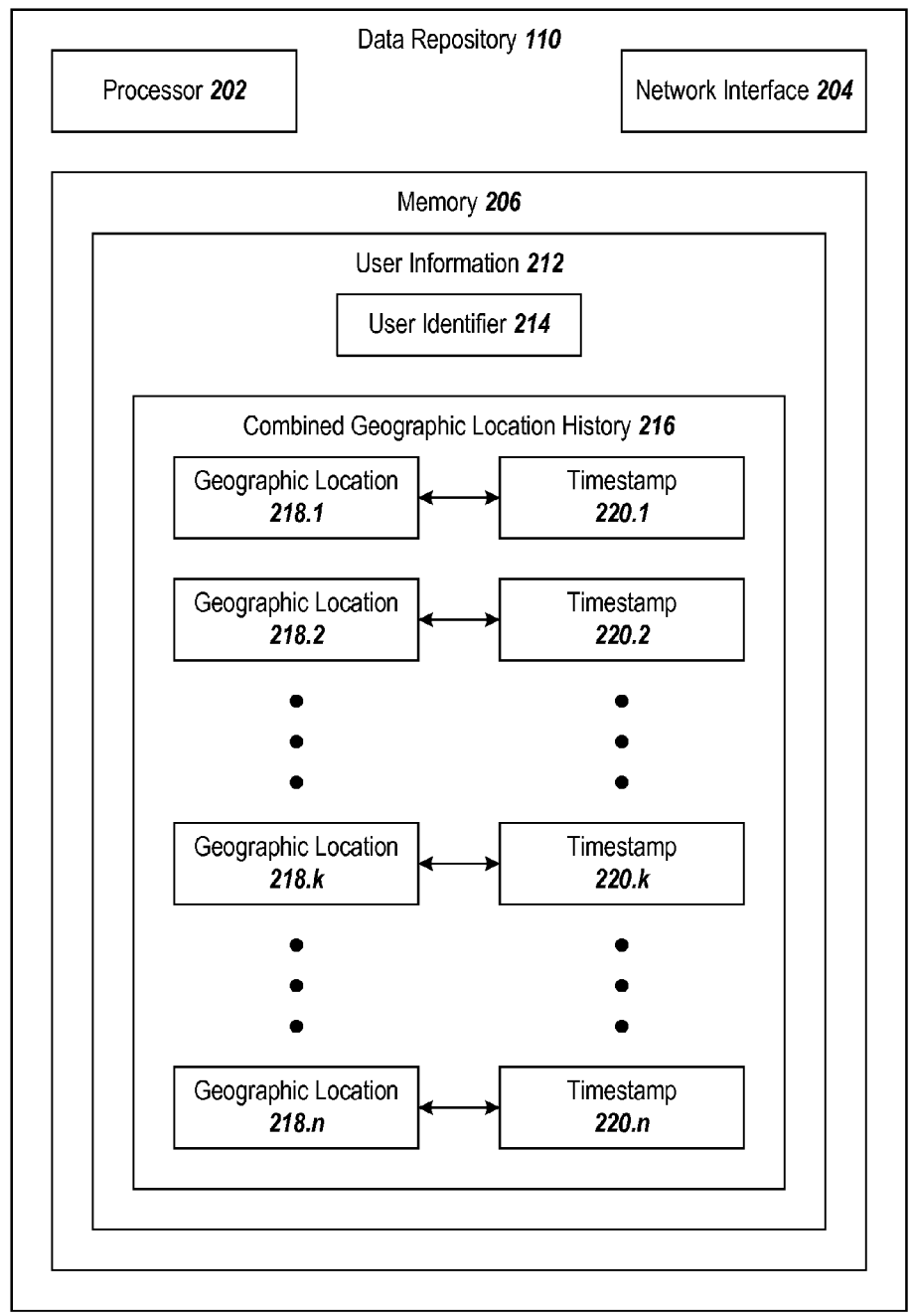
FIG. 2 illustrates an example of the data repository of FIG. 1 in more detail.

FIG. 2 illustrates an example of the data repository 110 in more detail.

As shown, the data repository 110 includes a processor 202, a network interface 204, and a memory 206. The processor 202 is configured to execute computer instructions that are stored in a computer-readable medium, for example, the memory 206. The processor 202 may be a central processing unit (CPU). While only one processor 202 is illustrated, the data repository 110 may include multiple processors. The network interface 204 is configured to allow the data repository 110 to transmit and receive data in a network, e.g., network 150 of FIG. 1. The network interface 204 may include one or more network interface cards (NICs). The memory 206 may correspond to a cache unit and/or a storage unit. The memory 206 stores data or instructions. As illustrated, the memory 206 includes user information 212.

While only one set of user information 212 is illustrated, the subject technology may be implemented in conjunction with multiple sets of user information 212 for multiple users of a geographic locating service, respectively. The user information 212 may include a user identifier 214 and a combined geographic location history 216.

The user identifier 214 may be a user name, a binary string, a character string, etc. that uniquely identifies a user of a geographic locating service.

The combined geographic location history 216 includes one or more geographic locations 218.1-n received from a mobile device 130 of the user. Each of the geographic locations 218.1-n may be represented as latitude and longitude coordinates. Alternatively, the geographic locations 218.1-n may be represented as street addresses or other types of location information. In example aspects, all or a portion of the geographic locations 218.1-n may include elevation information (e.g., 800 meters above sea level or on the 24th floor), indoor location information within a building (e.g., at the First Coffee Shop in the City Center Shopping Mall), or travel direction information (e.g., travelling east on Interstate 80). One or more of the geographic locations 218.1-n may also be associated with an accuracy radius (e.g., location is accurate within 100 m or within 2 km). Each geographic location 218.1-n may be coupled with a timestamp 220.1-n. The timestamp 220.1-n may indicate a time when the geographic location was determined (e.g., Feb. 1, 2012, at 8:05:12 AM Pacific Standard Time). Each geographic location 218.1-n may also be associated with a geographic location source that was used to determine the geographic location. Example geographic location sources may include a cellular signal, a WiFi signal, or a global positioning system (GPS) signal.

Figure 3:
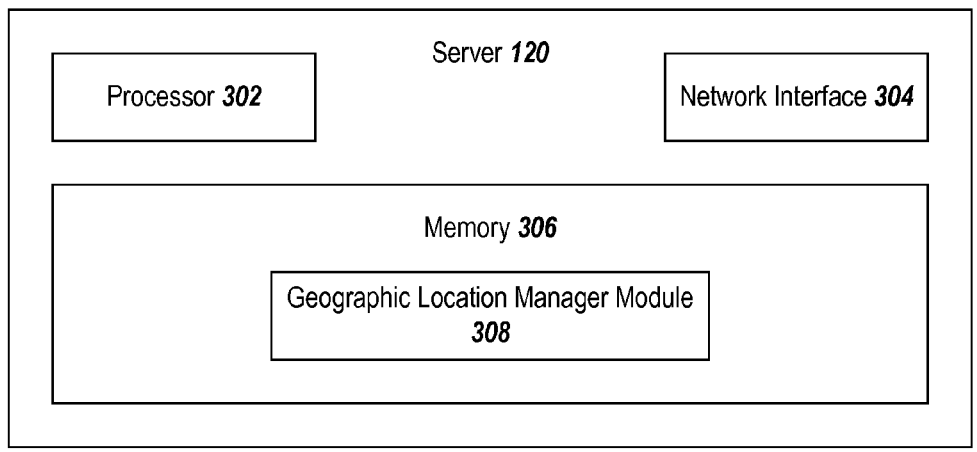
FIG. 3 illustrates an example of the server of FIG. 1 in more detail.

FIG. 3 illustrates an example of the server 120 in more detail.

As shown, the server 120 includes a processor 302, a network interface 304, and a memory 306. The processor 302 is configured to execute computer instructions that are stored in a computer-readable medium, for example, the memory 306. The processor 302 may be a central processing unit (CPU). While only one processor 302 is illustrated, the server 120 may include multiple processors. Furthermore, while the server 120 is illustrated as a single machine, the server 120 may include multiple machines, e.g., within a server farm. The network interface 304 is configured to allow the server 120 to transmit and receive data in a network, e.g., network 150 of FIG. 1. The network interface 304 may include one or more network interface cards (NICs). The memory 306 may correspond to a cache unit and/or a storage unit. The memory 306 stores data or instructions. As illustrated, the memory 306 includes a geographic location manager module 308.

The geographic location manager module 308 is configured to facilitate receiving, from a computing device (e.g., computing device 140) associated with a first user account, a request for a current geographic location of a specified user. The specified user may be different from the user of the user account. The geographic location manager module 308 is configured to authenticate that the first user account has permission to access the current geographic location of the specified user. If not, the geographic location manager module does not provide the geographic location of the specified user to the computing device. If so, the geographic location manager module 308 is configured to determine whether a geographic location of the specified user, obtained within a preset time period (e.g., two minutes) before a current time is stored within the memory of the server 120 or the data repository 110. If so, the geographic location manager module 308 transmits the stored geographic location of the specified user to the computing device.

If not, the geographic location manager module 308 is configured to facilitate transmitting, to a mobile device associated with the specified user, a request for a current geographic location of the mobile device. The geographic location manager module 308 is also configured to facilitate receiving, in response to the request for the current geographic location of the mobile device, a geographic location history of the mobile device. The geographic location history includes the current geographic location of the mobile device and a set of past geographic locations of the mobile device.

The geographic location manager module 308 is also configured to store, within the memory of the server 120 or the data repository 110, the geographic location history of the mobile device associated with the specified user. For example, the geographic location history of the mobile device may be combined with a geographic history already stored for the specified user within the memory of the server 120 or the data repository 110. The geographic location manager module is also configured to provide, to the computing device, the current geographic location of the mobile device associated with the specified user. The current geographic location of the mobile device of the specified user may be displayed via the computing device, for example, on a map.

As illustrated, different memory units 306 and 206 include the geographic location manager module 308 and the user information 212, respectively. However, in example aspects, the geographic location manager module 308 and the user information 212 may be stored within the same memory unit (e.g., within a single disk, within a memory unit of a single machine, or within a memory unit shared by multiple machines).

Figure 4:
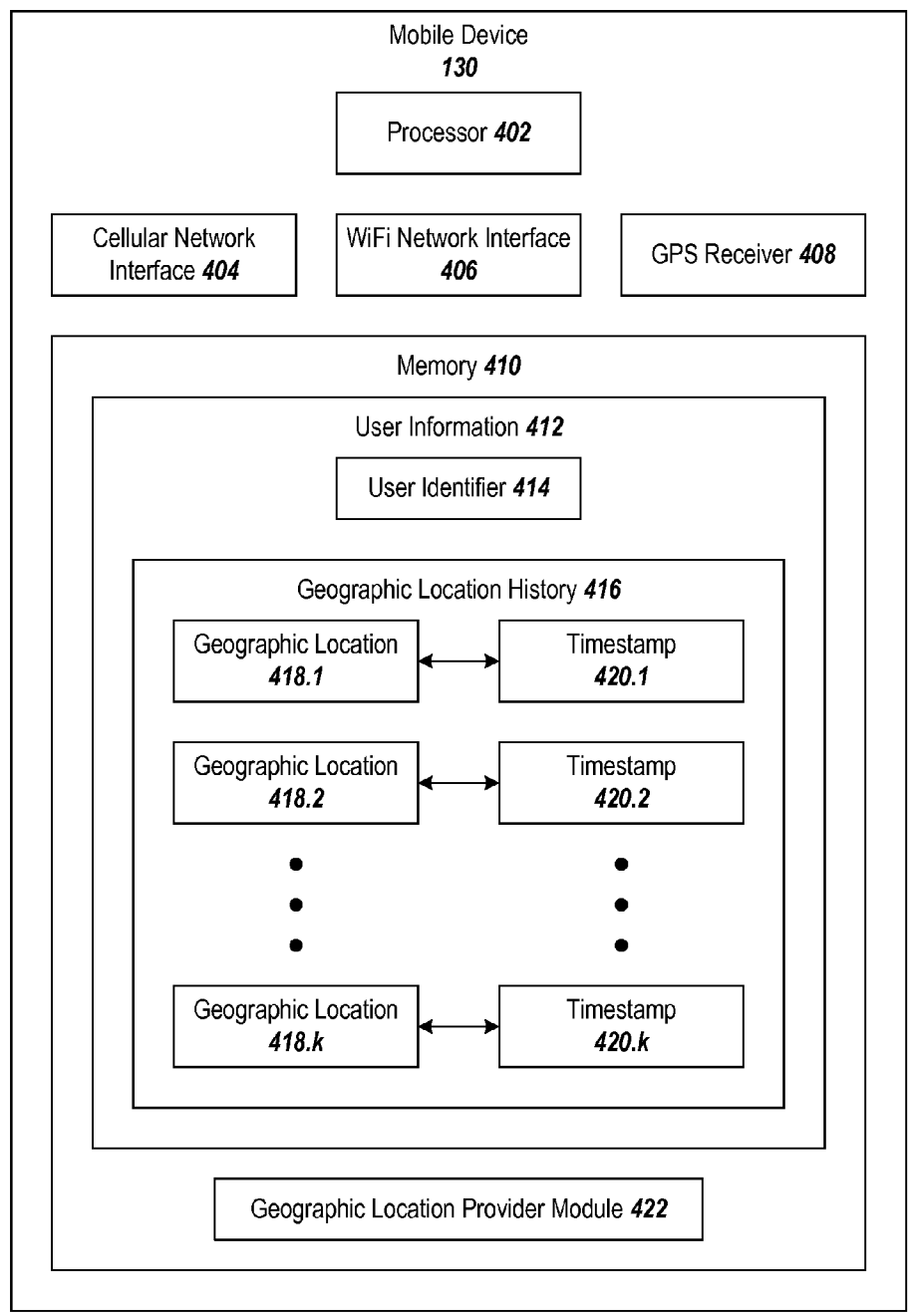
FIG. 4 illustrates an example of the mobile device of FIG. 1 in more detail.

FIG. 4 illustrates an example of the mobile device 130 in more detail.

As shown, the mobile device 130 includes a processor 402, a cellular network interface 404, a WiFi network interface 406, a global positioning system (GPS) receiver 408, and a memory 410. The processor 402 is configured to execute computer instructions that are stored in a computer-readable medium, for example, the memory 410. The processor 402 may be a central processing unit (CPU). The cellular network interface 404 is configured to allow the client computing device 130 to transmit and receive data, including geographic location data, in a cellular network. The cellular network interface 404 may include one or more network interface cards (NICs). The WiFi network interface 404 is configured to allow the client computing device 130 to transmit and receive data, including WiFi access point identifiers from which geographic location data may be derived, in a WiFi network. The WiFi network interface 404 may include one or more network interface cards (NICs). A data repository may store an association of WiFi access points and geographic locations, allowing the mobile device 130 to determine its current geographic location based on one or more visible WiFi access points. As the mobile device 130 may access the data repository storing the association of WiFi access points and geographic locations via the cellular network interface 404, the mobile device 130 need not connect to a WiFi access point to use the WiFi access point to determine its geographic location. The GPS receiver 408 is configured to determine a geographic location based on GPS signals.

In some aspects, the mobile device 130 is configured to determine the geographic location of the mobile device 130 via the cellular network interface 404. The cellular network interface 404 may receive cellular signals from multiple (e.g., three or more) cellular towers. The mobile device 130 may triangulate to determine the geographic location of the mobile device 130 based on the received signals from the cellular towers. Alternatively, the mobile device 130 may determine its approximate location (e.g., its location within a 10 kilometer radius or in which city, state, or country the mobile device is located) based on a cellular signal from a single cellular tower)

The memory 410 may correspond to a cache unit and/or a storage unit. The memory 410 stores data or instructions. As illustrated, the memory 410 includes a user information 412 and a geographic location provider module 422.

The user information 412 stored on the mobile device 130 may be similar to the user information 212 stored on the data repository 110. However, the mobile device 130 may store user information 412 for only a single user of the mobile device 130, rather than for multiple users of a geographic locating service. The data repository 110 may store multiple user information 212 for multiple users of the geographic locating service. The user information 412 on the mobile device 130 may include a user identifier 414 and a geographic location history 416.

The user identifier 414 may be a user name, a binary string, a character string, etc. that uniquely identifies a user of a geographic locating service. The user identifier 414 may be provided by the user of the mobile device to access the geographic locating service via the mobile device 130.

The geographic location history 416 may include one or more geographic locations 418.1-$k$. Each of the geographic locations 418.1-$k$ may be represented as latitude and longitude coordinates. Each of the geographic locations 418.1-$k$ may be coupled with a timestamp 420.1-$k$ representing a time when the mobile device 130 was at the corresponding geographic location 418.1-$k$. In some implementations, some of the geographic locations 418.1-$k$ may be associated with an accuracy radius (e.g., geographic location is accurate within 0.5 kilometers) or a source (e.g., cellular signal, WiFi signal, or GPS signal) of the geographic location. The geographic locations 418.1-$k$ may be transmitted to the data repository 110 and stored in the combined geographic location history 216 associated with the user in the data repository 110 (e.g., as geographic locations 218.1-$k$). The combined geographic location history 216 of the data repository 110 may also include additional geographic locations (e.g., geographic locations 218.$k$+1-$n$) which were received from the mobile device 130 at earlier times or which were received from other mobile devices of the user. (A single user may be associated with one or more mobile devices.)

The geographic location provider module 422 may be implemented in software. The geographic location provider module 422 includes code for storing the geographic location history 416 within the memory 410 of the mobile device 130. The geographic location history 416 may include a set of past geographic locations 418.1-$k$ of the mobile device 130 associated with timestamps 420.1-$k$. The geographic location provider module 422 also includes code for determining that a triggering event has occurred. Example triggering events may include a request for a current geographic location of the mobile device being received from the server 120 or a certain amount of time (e.g. 10 minutes or 60 minutes) passing since the geographic location history 416 was last transmitted to the server 120. The geographic location provider module 422 also includes code for determining a current geographic location of the mobile device. The current geographic location of the mobile device may be determined at any time or within regular intervals (e.g., once every twenty minutes). The current geographic location of the mobile device 130 may be determined based on one or more of a cellular signal accessible to the mobile device 130, a WiFi signal accessible to the mobile device 130, a GPS signal accessible to the mobile device 130, or the geographic location history 416. The geographic location provider module 422 also includes code for providing, in response to the triggering event, the geographic location history 416 to the server 120. The geographic location history 416 includes the current geographic location of the mobile device 130. Within the geographic location history 416, the current geographic location of the mobile device 130 is associated with a timestamp indicating the current time.

Figure 5:
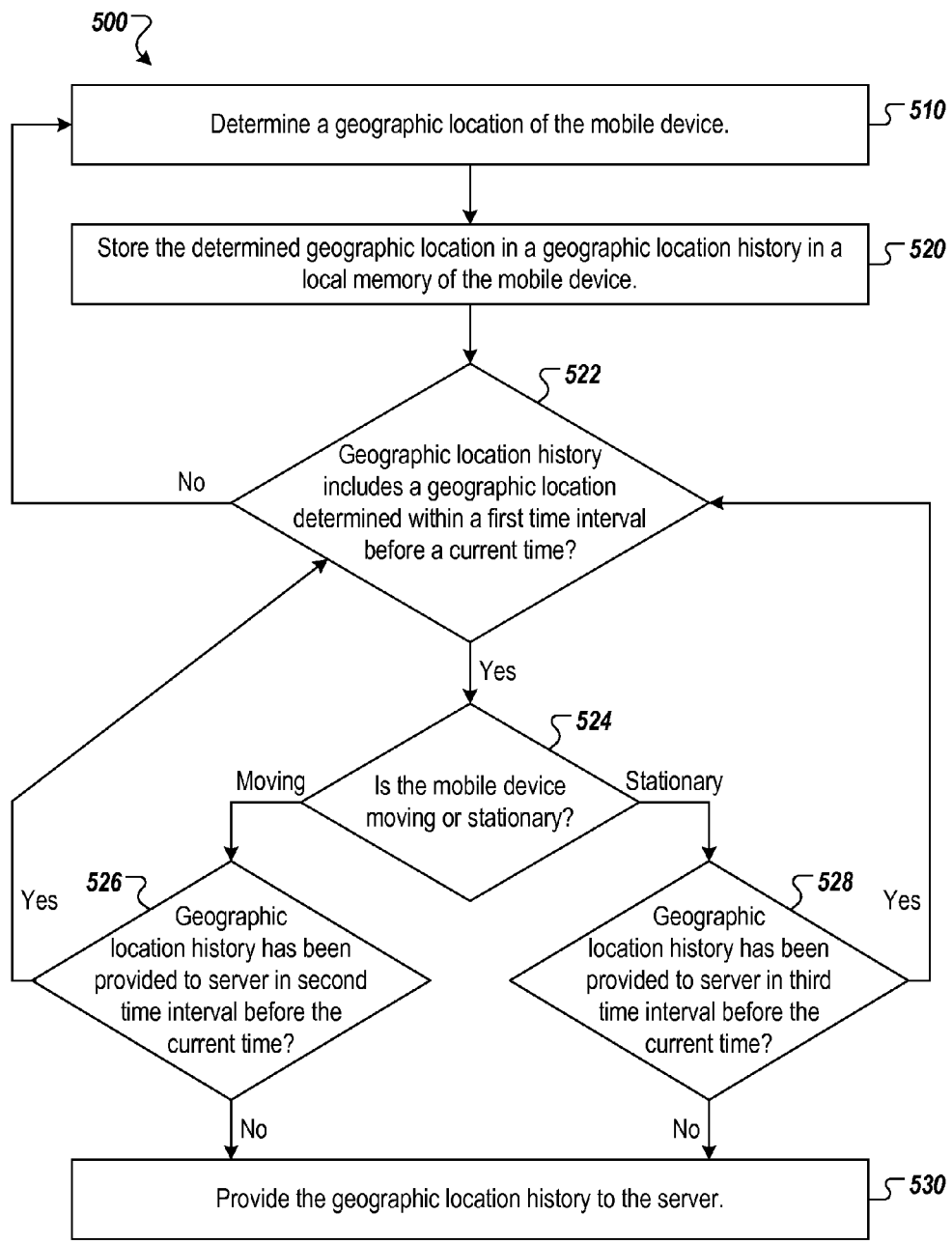
FIG. 5 illustrates an example process by which a geographic location history of a mobile device may be provided.

FIG. 5 illustrates an example process 500 by which a geographic location history of a mobile device may be provided.

The process 500 begins at step 510, where a mobile device (e.g., mobile device 130) determines a geographic location of the mobile device. The geographic location may be determined based on a cellular signal, a WiFi access point signal, or a GPS signal received at the mobile device.

In step 520, the mobile device stores the determined geographic location in a geographic location history (e.g., geographic location history 416) in a local memory of the mobile device. The geographic location history of the mobile device may be determined and stored in the geographic location history at a first time interval. The first time interval may vary based on whether the mobile device is moving or stationary (e.g., once every minute when moving or once every five minutes when stationary). The first time interval may be longer when the mobile device is stationary than when the mobile device is moving.

In step 522, the mobile device determines whether the geographic location history includes a geographic location determined within the first time interval before a current time (e.g., as measured by a clock on the mobile device). If so, the process 500 continues to step 524. If not, the process 500 returns to step 510.

In step 524, if the geographic location history includes a geographic location determined within the first time interval, the mobile device determines whether the mobile device is moving or stationary (e.g., by use of one or more of a motion sensor, a movement sensor, or an accelerometer, a gyrometer, or location determination techniques). If the mobile device is moving, the process 500 continues to step 526. If the mobile device is stationary, the process 500 continues to step 528.

In step 526, if the mobile device is moving, the mobile device determines whether the geographic location history has been provided to a server in a second time interval before the current time (e.g., within one hour before the current time). The second time interval is longer than the first time interval. If the geographic location history has been provided to the server in the second time interval, the process 500 returns to step 522. If the geographic location history has not been provided to the server in the second time interval, the process 500 continues to step 530.

In step 528, if the mobile device is stationary, the mobile device determines whether the geographic location history has been provided to a server in a second time interval before the current time (e.g., within four hours before the current time). The third time interval is longer than the second time interval. If the geographic location history has been provided to the server in the third time interval, the process 500 returns to step 522. If the geographic location history has not been provided to the server in the third time interval, the process 500 continues to step 530.

In step 530, the mobile device provides the geographic location history to the server. The geographic location history is provided to the server at a second time interval if the mobile device is moving and at a third time interval if the mobile device is stationary. After step 530, the process 500 ends.

Figure 6:
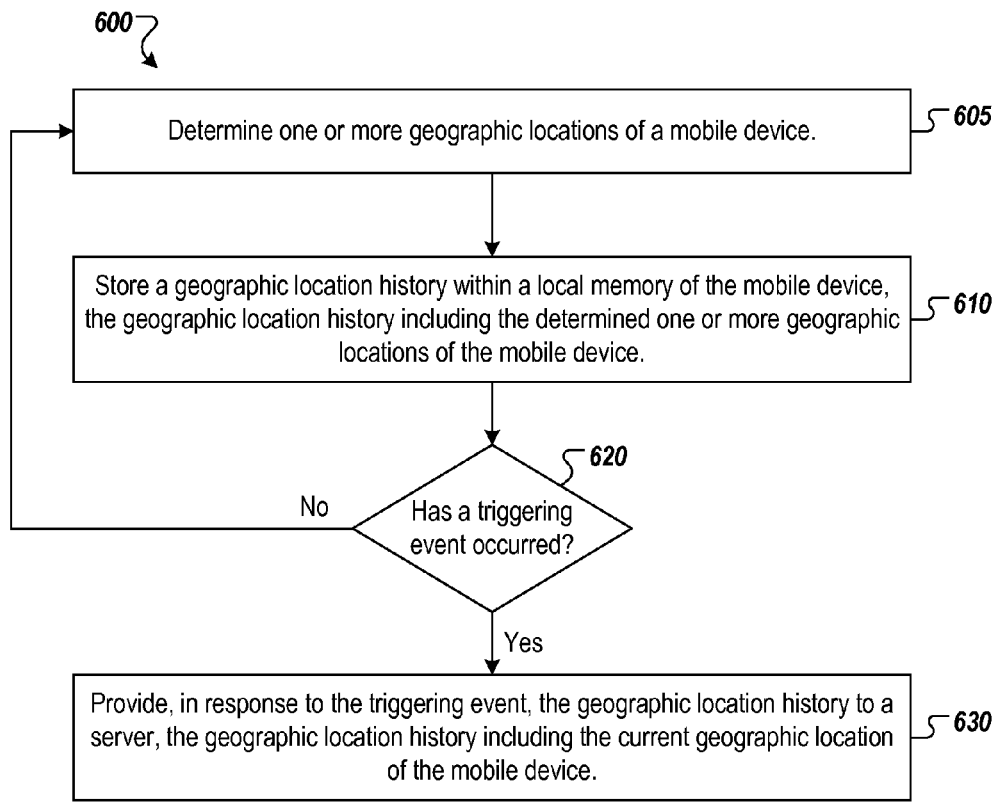
FIG. 6 illustrates an example process by which a geographic location of a mobile device may be provided.

FIG. 6 illustrates an example process 600 by which a geographic location of a mobile device may be provided.

The process 600 begins at step 605, where a mobile device (e.g., mobile device 130) determines one or more geographic locations of the mobile device.

In step 610, the mobile device stores a geographic location history (e.g., geographic location history 416) within a local memory of the mobile device. The geographic location history includes the determined one or more geographic locations of the mobile device. In other words, the geographic location history includes a set of past geographic locations of the mobile device. One or more of the past geographic locations in the set of past geographic locations may be associated with a timestamp indicating a time when the mobile device was at the past geographic location.

In step 620, the mobile device determines whether a triggering event has occurred. The mobile device may monitor for triggering event(s). The triggering event may include receiving a request, from the server (e.g., the server 120) for the current geographic location of the mobile device. Alternatively, the triggering event may include both (1) receiving a request, from the server, for the current geographic location of the mobile device and (2) determining that the geographic location has not been provided to the server for a first threshold time period before the current time. The first threshold time period may be determined based on whether the mobile device is moving or stationary (e.g., one minute if moving or five minutes if stationary). In another example aspect, the triggering event may include determining that the geographic location history of the mobile device has not been provided to the server for a second threshold time period before a current time. The second threshold time period may be determined based on whether the mobile device is moving or stationary (e.g., fifteen minutes if moving or two hours if stationary). A mobile device may determine whether it is moving or stationary, without accessing its location information, for example, based on a motion detector or a gyrometer within the mobile device or based on an increase or a decrease in signal strength of a WiFi signal or a cellular signal.

In one more example, the triggering event may include both (1) receiving a request, from the server, for the current geographic location of the mobile device and (2) determining that the geographic location history of the mobile device has not been provided to the server more than a preset number of times (e.g., 30 times) during a third threshold time period (e.g., 24 hours) before a current time. As a result, the battery life of the mobile device may be conserved as the mobile device may not transmit more than the preset number (e.g., 30) of responses to requests by the server for the current geographic location of the mobile device during each consecutive third threshold time period (e.g., 24 hour time period). A mobile device may receive more than the preset number of requests for its location, for example, if one or more users of computing devices (e.g., computing device 140) often request the location of the user of the mobile device via the geographic locating service.

In one implementation, the mobile device may determine its current geographic location in response to the triggering event. The current geographic location may be determined based on one or more of data already stored within the geographic location history stored on the mobile device, a WiFi signal accessible to the mobile device, or a cellular signal accessible to the mobile device. If the GPS receiver is turned on by another application (e.g., a navigation application) on the mobile device, the current geographic location may be determined based on the GPS signal. Alternatively, the mobile device may store the current geographic location, obtained by the other application for its own purposes, in the geographic location history. However, the mobile device may forego explicitly turning on its GPS receiver to determine its current geographic location in response to the triggering event. In one example aspect, if the mobile device determines that geographic location history includes a geographic location associated with a timestamp that is less than a preset amount of time (e.g., one minute) before the current time, then the geographic location associated with the timestamp may be determined to be the current geographic location. If the triggering event has not occurred, the process 600 returns to step 605. If the triggering event has occurred, the process 600 continues to step 630.

In step 630, if the triggering event has occurred, the mobile device provides, in response to the triggering event, the geographic location history to the server. The geographic location history may include the current geographic location of the mobile device. In example aspects, the mobile device may delete at least a portion of the geographic location history from the local memory of the mobile device upon providing the geographic location history to the server. After step 630, the process 600 ends.

As illustrated in FIG. 6, the mobile device provides its geographic location history to the server in response to passing of a certain time interval or in response to a request, by the server, for the geographic location of the mobile device. For example, the mobile device may provide its geographic location history to the server in response to a determination that the mobile device has not provided its geographic location history to the server within a threshold time period (e.g., ten minutes or one hour) before the current time. The threshold time period may be based on whether the mobile device is moving or stationary (e.g., ten minutes if moving or one hour if stationary). The determination that the mobile device has not provided its geographic location history to the server within the threshold time period may be made by the mobile device or by the server (which may then provide a request to the mobile device for the current geographic location of the mobile device). A user of the mobile device may disable the mobile device from transmitting its current geographic location or its geographic location history to the server or the user of the mobile device may need to affirmatively enable the mobile device to transmit its current geographic location and geographic location history to the server.

Figure 7:
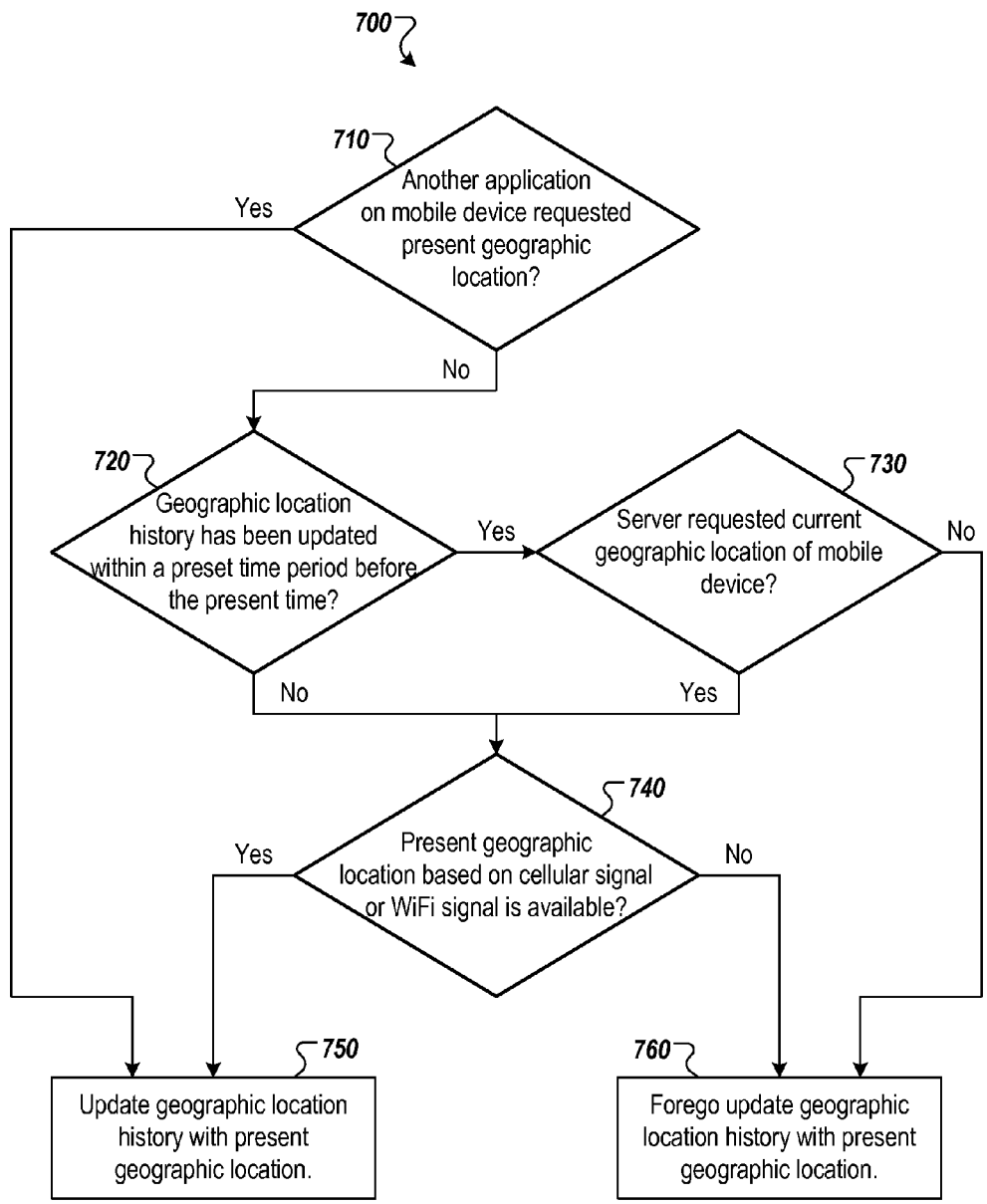
FIG. 7 illustrates an example process by which a geographic location history stored on a mobile device may be updated.

FIG. 7 illustrates an example process 700 by which a geographic location history stored on a mobile device may be created and updated. The geographic location history also be transmitted to the server using another process (e.g., via the process 600 described in conjunction with FIG. 6).

The process 700 begins at step 710, where the mobile device (e.g., mobile device 130) determines whether another application on the mobile device has requested a present geographic location of the mobile device (e.g., a mapping application or a navigation application may request a current geographic location, which may be determined by a global positioning system within the mobile device or by another technique). As used herein, the phrase "another application," encompasses its plain and ordinary meaning including, but not limited to, an application different from the geographic location history provider application the operation of which is described herein in conjunction with FIG. 5 and/or FIG. 6. If another application determines the present geographic location of the mobile device, the mobile device may store the determined present geographic location in the geographic location history. The present geographic location may be determined by one or more of a cellular signal, a WiFi signal, or a global positioning system signal. If another application on the mobile device has requested a present geographic location of the mobile device, the process 700 continues to step 750. If not, the process 700 continues to step 720.

In step 720, if another application on the mobile device has not requested the present geographic location of the mobile device, the mobile device determines whether the geographic location history has been updated within a preset time period before the present time. The preset time period may be based on whether the mobile device is moving or stationary (e.g., one minute if moving or five minutes if stationary). A mobile device may determine whether it is moving or stationary, without accessing its location information, for example, based on a motion detector or a gyrometer within the mobile device or based on an increase or a decrease in signal strength of a WiFi signal or a cellular signal. If so, the process 700 continues to step 730. if not, the process 700 continues to step 740.

In step 730, if the geographic location history has been updated within a preset time period before the present time, the mobile device determines whether the server has requested the current geographic location of the mobile device (e.g., via step 620 in FIG. 6). If so, the process 700 continues to step 740. If not, the process 700 continues to step 760.

In step 740, if either (1) the geographic location history has not been updated within the preset time period before the present time or (2) the server has requested the current geographic location of the mobile device, the mobile device determines whether a present geographic location based on a cellular signal or a WiFi signal is available. The mobile device may not attempt to determine its geographic location via a global positioning system (GPS) signal because turning on the GPS receiver and determining the geographic location via the GPS signal may require more battery or power usage than determining the geographic location based on the cellular signal or the WiFi signal. If a present geographic location based on a cellular signal or a WiFi signal is available, the process 700 continues to step 750. Otherwise, the process 700 continues to step 760.

In step 750, if either (1) another application on the mobile device requested the present geographic location, or (2) a present geographic location based on the cellular signal or the WiFi signal is available, the mobile device updates the geographic location history with the present geographic location. After step 750, the process 700 ends.

In step 760, if either (1) the server did not request the current geographic location of the mobile device, or (2) a present geographic location based on a cellular signal or a WiFi signal is not available, the mobile device foregoes updating the geographic location history with the present geographic location (as the present geographic location may not be available). After step 760, the process 700 ends.

Figure 8A:
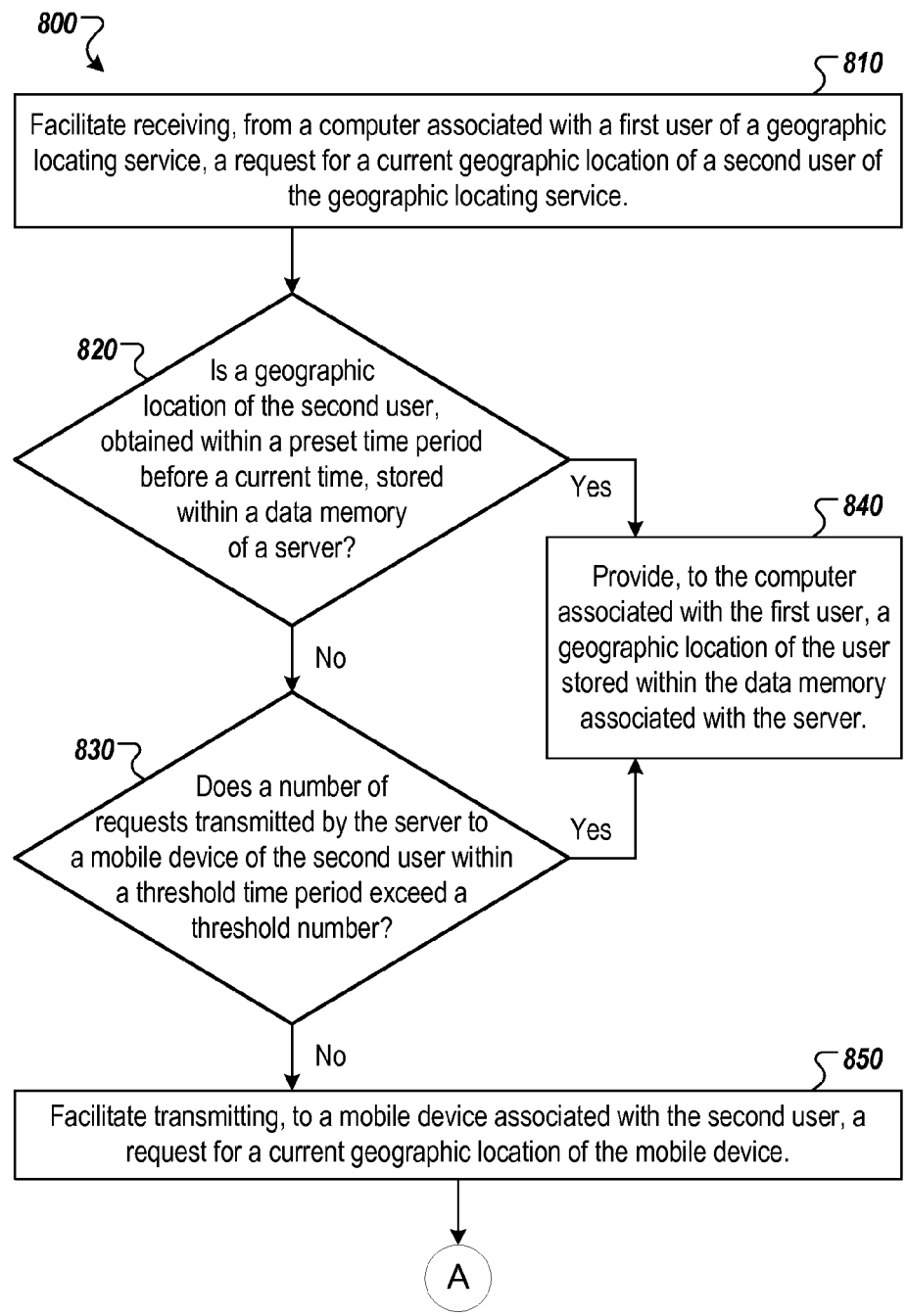
FIGS. 8A-8B illustrates an example process by which a geographic location of a mobile device may be provided.
Figure 8B:
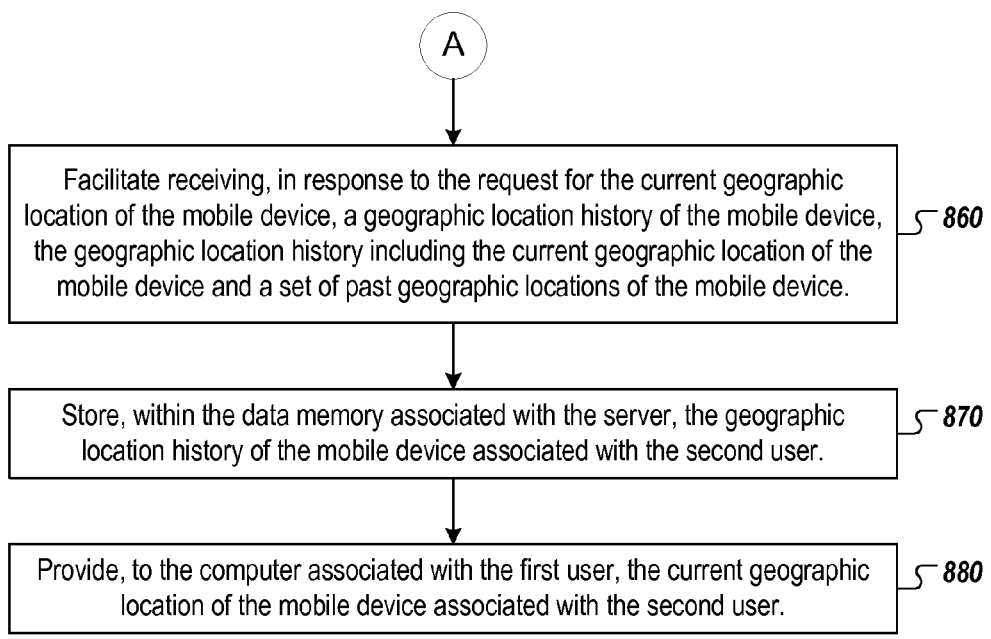

FIGS. 8A-8B illustrate an example process 800 by which a geographic location of a mobile device may be provided.

The process 800 begins at step 810, where the server (e.g., server 120) facilitates receiving, from a computer (e.g., computing device 140) associated with a first user of a geographic locating service, a request for a current geographic location of a second user of the geographic locating service. The second user has affirmatively given permission for the first user to track the second user's location, and the first user is unable to track the second user's location without such permission. The first user and the second user may be social contacts (e.g., friends) within a social networking service associated with the geographic locating service.

In step 820, the server determines if a geographic location of the second user, obtained within a preset time period (e.g., two minutes) before a current time, is stored within a data memory associated with the server (e.g., a data repository associated with the server or a local data memory on the server). If so, then the process 800 continues to step 840. If not, the process 800 continues to step 830.

In step 830, the server determines if a number of requests transmitted by the server to a mobile device (e.g., mobile device 130) of the second user within a threshold time period (e.g., 24 hours) exceeds a threshold number (e.g., 30 requests). A large number of requests may significantly drain the battery of the mobile device, wasting energy, reducing the battery life of the mobile device, and preventing a user of the mobile device from engaging in other activities (e.g., making telephone calls, reading electronic messages, etc.) on the mobile device. If the number of requests exceeds the threshold number, the process 800 continues to step 840. If not, the process 800 continues to step 850.

In step 840, if either (1) the geographic location of the second user was obtained within a preset time period (e.g., two minutes) before the current time or (2) the number of requests transmitted by the server to the mobile device of the second user within a threshold time period (e.g., 24 hours) exceeds a threshold number (e.g., 30 requests), the server provides, to the computer associated with the first user, a geographic location of the user stored within the data memory associated with the server (rather than receiving a new current geographic location from the mobile device, to avoid wasting the battery of the mobile device). The server may forego transmitting, to the mobile device associated with the second user, the request for the current geographic location of the mobile device. The computer associated with the first user may then display the geographic location, e.g., via a map on the screen of the computer. After step 840, the process 800 ends.

In step 850, if both (1) the geographic location of the second user was not obtained within a preset time period (e.g., two minutes) before the current time or (2) the number of requests transmitted by the server to the mobile device of the second user within a threshold time period (e.g., 24 hours) does not exceed a threshold number (e.g., 30 requests), the server facilitates transmitting, to a mobile device associated with the second user, a request for the current geographic location of the mobile device (e.g., expressed as a latitude and longitude).

In step 860, the server facilitates receiving, in response to the request for the current geographic location of the mobile device, a geographic location history of the mobile device. The geographic location history of the mobile device may include the current geographic location of the mobile device and a set of past geographic locations of the mobile device.

In step 870, the server stores, within the data memory associated with the server, the geographic location history of the mobile device associated with the second user. In some example aspects, the server may facilitate receiving, from a computer associated with the second user, a request to view the geographic location history. The server may provide an indication of the geographic location history for display via the computer associated with the second user in response to the request to view the geographic location history. In other example aspects, the second user may be able to share his/her geographic location history with a third user, and the third user may provide the request to view the geographic location history and receive the indication of the geographic location history.

In one implementation, the server may incorporate the geographic location history of the mobile device within a combined geographic location history of the second user stored within the data memory associated with the server. The combined geographic location history of the second user may include a plurality of geographic locations received from one or more mobile devices associated with the second user. For example, the combined geographic location history may include geographic locations from one or more geographic location histories sent from a mobile phone of the second user and from one or more geographic location histories sent from a personal digital assistant (PDA) of the second user.

In step 880, the server provides, to the computer associated with the first user, the current geographic location of the mobile device associated with the second user. After step 880, the process 800 ends.

Aspects of the subject technology involve determining geographic location(s) of a mobile device and transmitting the determined geographic location(s) to a server. The determinations of geographic location are known to the user and described in contextual notices provide to the user in plain language, for example, when the user downloads or executes an application. Furthermore, persistent reminders are provided in the user interface of the mobile device that the geographic location is being determined and transmitted. In some aspects, periodic reminders are provided to the user when the user logs into an application (e.g., every tenth login or every thirty days) or electronic messages (e.g., email) are provided to the user to remind him/her of the determinations of the geographic location. The user explicitly and affirmatively provides consent to having the geographic location of his/her mobile device determined and may easily withdraw or revoke such consent at any time via the user interface of the mobile device. Furthermore, the user may remove any geographic location information associated with the mobile device of the user stored by the service (e.g., in a data repository or a server). In some aspects, a privacy dashboard may be provided via the mobile device that allows the user to determine which information about his/her current or past geographic locations is stored by the service or by the mobile device or to remove such information from the service or from the mobile device. Furthermore, all geographic location information is encrypted when transmitted over a network to prevent unauthorized access to the geographic location information.

Figure 9:
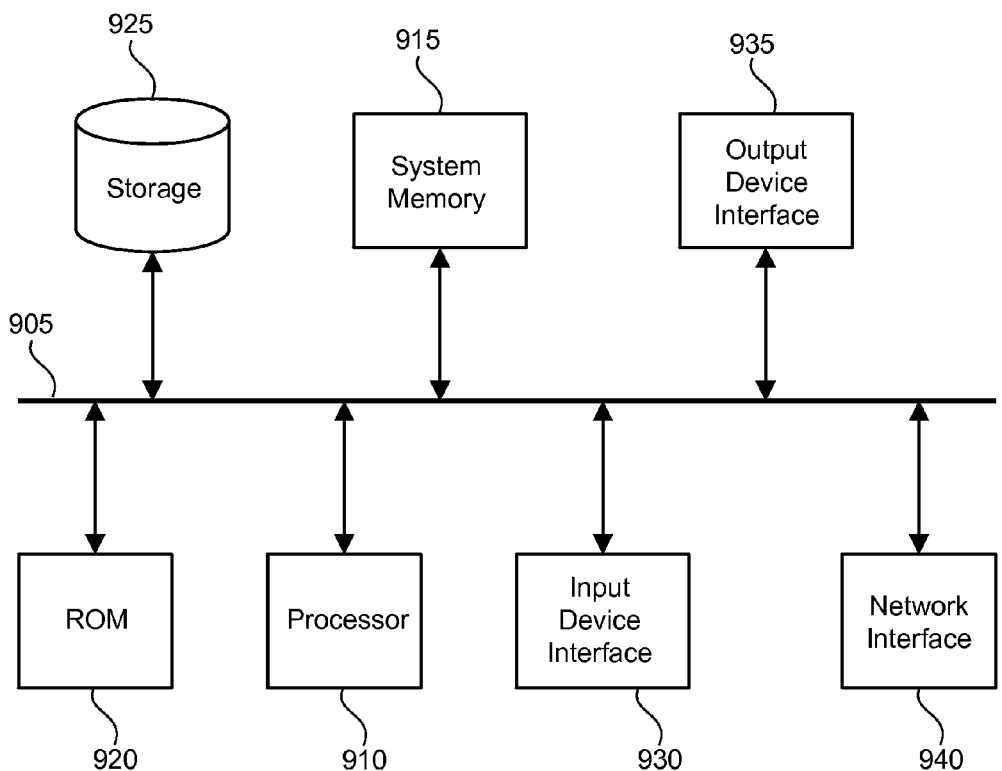
FIG. 9 conceptually illustrates an example electronic system with which some implementations of the subject technology are implemented.

FIG. 9 conceptually illustrates an electronic system 900 with which some implementations of the subject technology are implemented. For example, one or more of the data repository 110, the server 120, the mobile device 130, or the computing device 140 may be implemented using the arrangement of the electronic system 900. The electronic system 900 can be a computer (e.g., a mobile phone, PDA), or any other sort of electronic device. Such an electronic system includes various types of computer readable media and interfaces for various other types of computer readable media. Electronic system 900 includes a bus 905, processing unit(s) 910, a system memory 915, a read-only memory 920, a permanent storage device 925, an input device interface 930, an output device interface 935, and a network interface 940.

The bus 905 collectively represents all system, peripheral, and chipset buses that communicatively connect the numerous internal devices of the electronic system 900. For instance, the bus 905 communicatively connects the processing unit(s) 910 with the read-only memory 920, the system memory 915, and the permanent storage device 925.

From these various memory units, the processing unit(s) 910 retrieves instructions to execute and data to process in order to execute the processes of the subject technology. The processing unit(s) can be a single processor or a multi-core processor in different implementations.

The read-only-memory (ROM) 920 stores static data and instructions that are needed by the processing unit(s) 910 and other modules of the electronic system. The permanent storage device 925, on the other hand, is a read-and-write memory device. This device is a non-volatile memory unit that stores instructions and data even when the electronic system 900 is off. Some implementations of the subject technology use a mass-storage device (for example a magnetic or optical disk and its corresponding disk drive) as the permanent storage device 925.

Other implementations use a removable storage device (for example a floppy disk, flash drive, and its corresponding disk drive) as the permanent storage device 925. Like the permanent storage device 925, the system memory 915 is a read-and-write memory device. However, unlike storage device 925, the system memory 915 is a volatile read-and-write memory, such a random access memory. The system memory 915 stores some of the instructions and data that the processor needs at runtime. In some implementations, the processes of the subject technology are stored in the system memory 915, the permanent storage device 925, or the read-only memory 920. For example, the various memory units include instructions for determining a geographic location of a mobile device in accordance with some implementations. From these various memory units, the processing unit(s) 910 retrieves instructions to execute and data to process in order to execute the processes of some implementations.

The bus 905 also connects to the input and output device interfaces 930 and 935. The input device interface 930 enables the user to communicate information and select commands to the electronic system. Input devices used with input device interface 930 include, for example, alphanumeric keyboards and pointing devices (also called "cursor control devices"). Output device interfaces 935 enables, for example, the display of images generated by the electronic system 900. Output devices used with output device interface 935 include, for example, printers and display devices, for example cathode ray tubes (CRT) or liquid crystal displays (LCD). Some implementations include devices for example a touchscreen that functions as both input and output devices.

Finally, as shown in FIG. 9, bus 905 also couples electronic system 900 to a network (not shown) through a network interface 940. In this manner, the electronic system 900 can be a part of a network of computers (for example a local area network ("LAN"), a wide area network ("WAN"), or an intranet, or a network of networks, for example the Internet. Any or all components of electronic system 900 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for providing a geographic location of a mobile device, the method comprising:
   determining a geographic location of the mobile device;
   storing the determined geographic location in a geographic location history in a local memory of the mobile device, wherein the geographic location of the mobile device is determined and stored in the geographic location history at a first time interval;
   determining whether the mobile device is moving or stationary;
   providing the geographic location history to a server at a second time interval if the mobile device is moving, wherein the second time interval is longer than the first time interval; and
   providing the geographic location history to the server at a third time interval if the mobile device is stationary, wherein the third time interval is longer than the second time interval.

2. The method of claim 1, wherein the geographic location history comprises a plurality of determined geographic locations of the mobile device, and
   wherein each determined geographic location comprises a time stamp corresponding to a time when the geographic location was determined.

3. The method of claim 1, further comprising:
   receiving a request for the geographic location of the mobile device from the server,
   wherein the geographic location history is provided to the server in response to the request.

4. The method of claim 3, wherein the geographic location history is provided to the server independent of the second time interval and the third time interval, and
   wherein the second time interval and the third time interval are reset after the geographic location history has been provided to the server.

5. The method of claim 1, further comprising:
   receiving a request for the geographic location of the mobile device from the server; and
   determining a reporting time when the geographic location history was last provided to the server,
   wherein the geographic location history is provided to the server in response to the request if the determined reporting time is beyond a fourth time interval, and
   wherein the geographic location history is provided to the server at the second time interval or the third time interval if the determined reporting time is within the fourth time interval.

6. The method of claim 5, wherein the fourth time interval is based on whether the mobile device is moving or is stationary.

7. The method of claim 6, wherein the fourth time interval is longer if the mobile device is stationary than if the mobile device is moving.

8. The method of claim 1, wherein the geographic location of the mobile device is determined based on a received global positioning system (GPS) signal.

9. The method of claim 1, wherein the geographic location of the mobile device is determined based on a received cellular communications signal.

10. The method of claim 1, wherein the geographic location of the mobile device is determined based on a received WiFi access point signal.

11. The method claim 1, further comprising clearing the geographic location history from the local memory of the mobile device after the geographic location history has been provided to the server.

12. A computer-readable medium for providing a geographic location of a computer, the computer-readable medium comprising instructions which, when executed by the computer, cause the computer to:
- store a determined geographic location in a geographic location history in a local memory of the computer, wherein the geographic location of the computer is determined and stored in the geographic location history at a first time interval;
- determine whether the computer is moving or stationary;
- provide the geographic location history to a server at a second time interval if the computer is moving, wherein the second time interval is longer than the first time interval; and
- provide the geographic location history to the at a third time interval if the computer is stationary, wherein the third time interval is longer than the second time interval.

13. The computer-readable medium of claim 12, further comprising instructions which, when executed by the computer, cause the computer to:
- determine the current geographic location of the computer.

14. The computer-readable medium of claim 13, wherein the instructions to determine the current geographic location of the computer comprise instructions which, when executed by the computer, cause the computer to:
- determine the current geographic location of the computer based on the geographic location history.

15. The computer-readable medium of claim 14, wherein the instructions to determine the current geographic location of the computer based on the geographic location history comprise instructions which, when executed by the computer, cause the computer to:
- determine that the geographic location history comprises a first geographic location of the computer, the first geographic location having been determined within a threshold time period before a current time; and
- determine the current geographic location of the computer based on the first geographic location.

16. The computer-readable medium of claim 12, wherein the geographic location history comprises one or more of geographic locations associated with a timestamp.

17. The computer-readable medium of claim 12, wherein the geographic location history comprises one or more of geographic locations associated with a geographic location source, wherein the geographic location source comprises one or more of a cellular signal, a WiFi signal, or a global positioning system (GPS) signal.

18. The computer-readable medium of claim 12, further comprising instructions which, when executed by the computer, cause the computer to:
- clear the geographic location history from the local memory of the computer after the geographic location history has been provided to the server.

19. The computer-readable medium of claim 12, further comprising instructions which, when executed by the computer, cause the computer to:
- receive a request, from a first local application executing on the computer, for a present geographic location of the computer;
- determine the present geographic location of the computer in response to the request; and
- store the determined present geographic location of the computer within the geographic location history.

20. A mobile device configured to provide a geographic location of the mobile device, the mobile device comprising:
- one or more processors;
- a memory comprising instructions which, when executed by the one or more processors, cause the one or more processors to:
  - store a determined geographic location and a timestamp in a geographic location history in a local memory unit of the mobile device, wherein the timestamp indicates a time of determination of the determined geographic location, and wherein the geographic location of the mobile device is determined and stored in the geographic location history at a first time interval;
  - determine whether the mobile device is moving or stationary;
  - provide the geographic location history to a server at a second time interval if the mobile device is moving, wherein the second time interval is longer than the first time interval; and
  - provide the geographic location history to the server at a third time interval if the mobile device is stationary, wherein the third time interval is longer than the second time interval.

21. The mobile device of claim 20, wherein the memory comprises the local memory unit.

22. The mobile device of claim 20, wherein the instructions to determine the current geographic location of the mobile device comprise instructions which, when executed by the one or more processors, cause the one or more processors to:
- determine the current geographic location of the mobile device based on a WiFi signal accessible to the mobile device.

* * * * *